US012646751B2

(12) United States Patent
Jiang et al.

(10) Patent No.: US 12,646,751 B2
(45) Date of Patent: Jun. 2, 2026

(54) ELECTROLYTE COMPOSITION INCLUDING LITHIUM SALT, FLUOROETHYLENE CARBONATE, VINYLENE CARBONATE, AND METAL-TRIFLUOROMETHANESULFONIMIDE SALT ADDITIVE AND BATTERY AND DEVICE INCLUDING THE ELECTROLYTE COMPOSITION

(71) Applicant: GM GLOBAL TECHNOLOGY OPERATIONS LLC, Detroit, MI (US)

(72) Inventors: Meng Jiang, Rochester Hills, MI (US); Chuanlong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 538 days.

(21) Appl. No.: 18/300,486

(22) Filed: Apr. 14, 2023

(65) Prior Publication Data

US 2024/0347770 A1 Oct. 17, 2024

(51) Int. Cl.
*H01M 10/0567* (2010.01)
*H01M 10/0569* (2010.01)

(52) U.S. Cl.
CPC ... *H01M 10/0567* (2013.01); *H01M 10/0569* (2013.01); *H01M 2300/0037* (2013.01)

(58) Field of Classification Search
CPC .................. H01M 10/0567; H01M 10/0569
USPC .................. 429/304, 319, 332, 188
See application file for complete search history.

(56) References Cited

U.S. PATENT DOCUMENTS

2016/0233513 A1* 8/2016 Abe ...................... H01G 11/38
2022/0278371 A1* 9/2022 Kawabata ............. H01M 4/382

FOREIGN PATENT DOCUMENTS

CN 114597491 A * 6/2022 ........ H01M 10/0525
JP 2021163706 A * 10/2021

OTHER PUBLICATIONS

Goodman et al. Effect of Alkali and Alkaline Earth Metal Salts on Suppression of Lithium Dendrites, May 31, 2014, Journal of The Electrochemical Society, 161, D418-D424) (Year: 2014).*
Uppuluri et al., Electrochemical Formation of Li-M-(M')-Si Phases Using Multivalent Electrolyte Salt Additives, Mar. 1, 2023, Journal of The Electrochemical Society, 170, 030501 (Year: 2023).*

* cited by examiner

*Primary Examiner* — Sean P Cullen
(74) *Attorney, Agent, or Firm* — Quinn IP Law

(57) ABSTRACT

An electrolyte composition for batteries is provided. The electrolyte composition includes a solvent blend that includes cyclic carbonate and linear carbonate. The electrolyte composition further includes a lithium-based salt, fluoroethylene carbonate, vinylene carbonate, and a metal-based salt additive. The metal-based salt additive includes counterions of a metal and trifluoromethanesulfonimide. The metal is chosen from magnesium (Mg), manganese (Mn), aluminum (Al), iron (Fe), nickel (Ni), or combinations thereof.

13 Claims, 3 Drawing Sheets

ELECTROLYTE COMPOSITION INCLUDING LITHIUM SALT, FLUOROETHYLENE CARBONATE, VINYLENE CARBONATE, AND METAL-TRIFLUOROMETHANESULFONIMIDE SALT ADDITIVE AND BATTERY AND DEVICE INCLUDING THE ELECTROLYTE COMPOSITION

The disclosure generally relates to an electrolyte composition for batteries.

Battery cells may include an anode, a cathode, an electrolyte composition, and a separator. A battery cell may operate in charge mode, receiving electrical energy. A battery cell may operate in discharge mode, providing electrical energy. A battery cell may operate through charge and discharge cycles, where the battery first receives and stores electrical energy and then provides electrical energy to a connected system. In vehicles utilizing electrical energy to provide motive force, battery cells of the vehicle may be charged, and then the vehicle may navigate for a period of time, utilizing the stored electrical energy to generate motive force.

A battery cell includes an electrolyte composition which provides lithium-ion conduction paths between the anode and the cathode. The electrolyte is an ionic conductor. The electrolyte is additionally an electronically insulating material.

One of the factors that determines the commercial viability of a battery cell is its capacity and cycling tolerance. A battery cell(s) for an automotive vehicle with an electric-drive powertrain may be tasked to provide at least 30,000 hours of service. Such high requirements may present a challenge to the vehicle's battery cell(s).

SUMMARY

An electrode composition for batteries is provided. The electrolyte composition includes a solvent blend that includes cyclic carbonate and linear carbonate. The electrode composition further includes a lithium-based salt, fluoroethylene carbonate, vinylene carbonate, and a metal-based salt additive. The metal-based salt additive includes counterions of a metal and trifluoromethanesulfonimide. The metal is chosen from magnesium (Mg), manganese (Mn), aluminum (Al), iron (Fe), nickel (Ni), or combinations thereof.

In some embodiments, the metal-based salt additive includes magnesium bis (trifluoromethanesulfonyl) imide.

In some embodiments, the metal-based salt additive includes manganese bis (trifluoromethanesulfonyl) imide.

In some embodiments, the metal-based salt additive is present in an amount of from about 1.0 wt. % to about 3.0 wt. %, based on a total weight of the electrolyte composition.

In some embodiments, the lithium-based salt is present in the solvent blend at a concentration from about 0.5 molarity (M) to about 1.5 M.

In some embodiments, a ratio of cyclic carbonate to linear carbonate in the solvent blend is from about 1:9 to about 9:1.

In some embodiments, fluoroethylene carbonate is present in the electrolyte composition in an amount of from about 1.5 wt. % to about 2.5 wt. %, based on a total weight of the electrolyte composition.

In some embodiments, vinylene carbonate is present in the electrolyte composition in an amount of from about 0.5 wt. % to about 1.5 wt. %, based on a total weight of the electrolyte composition.

In some embodiments, the metal-based salt additive is chosen from magnesium bis (trifluoromethanesulfonyl) imide, manganese bis (trifluoromethanesulfonyl) imide, or a combination thereof and is present in the electrolyte composition in an amount of from about 1.5 wt. % to about 2.5 wt. %, based on a total weight of the electrolyte composition. The lithium-based salt is chosen from lithium hexafluorophosphate, lithium tetrafluoroborate, lithium bis (fluorosulfonyl) imide, lithium bis (trifluoromethanesulfonyl) imide, or combinations thereof and is present in the solvent blend at a concentration of from about 0.5 M to about 1.5 M. Fluoroethylene carbonate is present in the electrolyte composition in the amount of from about 1.5 wt. % to about 2.5 wt. %, based on the total weight of the electrolyte composition. Vinylene carbonate is present in the electrolyte composition in the amount of from about 0.5 wt. % to about 1.5 wt. %, based on the total weight of the electrolyte composition.

According to an alternative embodiment, a battery is provided. The battery includes a silicon-containing anode, a nickel-based cathode, and an electrolyte composition disposed between the silicon-containing anode and the nickel-based cathode. The electrolyte composition includes a solvent blend that includes cyclic carbonate and linear carbonate. The electrolyte composition further includes a lithium-based salt, fluoroethylene carbonate, vinylene carbonate, and a metal-based salt additive. The metal-based salt additive includes counterions of a metal and trifluoromethanesulfonimide. The metal is chosen from magnesium (Mg), manganese (Mn), aluminum (Al), iron (Fe), nickel (Ni), or combinations thereof.

In some embodiments, the metal-based salt additive is chosen from magnesium bis (trifluoromethanesulfonyl) imide, manganese bis (trifluoromethanesulfonyl) imide, or a combination thereof.

In some embodiments, the metal-based salt additive is present in an amount of from about 1.0 wt. % to about 3.0 wt. %, based on a total weight of the electrolyte composition.

In some embodiments, the lithium-based salt is chosen from lithium hexafluorophosphate, lithium tetrafluoroborate, lithium bis (fluorosulfonyl) imide, lithium bis (trifluoromethanesulfonyl) imide, or combinations thereof and is present in the solvent blend at a concentration of from about 0.5 M to about 1.5 M.

In some embodiments, a ratio of cyclic carbonate to linear carbonate in the solvent blend is from about 1:9 to about 9:1.

In some embodiments, fluoroethylene carbonate is present in the electrolyte composition in an amount of from about 1.5 wt. % to about 2.5 wt. %, based on a total weight of the electrolyte composition, and wherein vinylene carbonate is present in the electrolyte composition in the amount of from about 0.5 wt. % to about 1.5 wt. %, based on the total weight of the electrolyte composition.

According to an alternative embodiment, a device is provided. The device includes an output component, and a battery configured for providing electrical energy to the output component. The battery includes a silicon-containing anode, a nickel-based cathode, and an electrolyte composition disposed between the silicon-containing anode and the nickel-based cathode. The electrolyte composition includes a solvent blend that includes cyclic carbonate and linear carbonate. The electrolyte composition further includes a lithium-based salt, fluoroethylene carbonate, vinylene carbonate, and a metal-based salt additive. The metal-based salt additive includes counterions of a metal and trifluoromethanesulfonimide. The metal is chosen from magnesium (Mg), manganese (Mn), aluminum (Al), iron (Fe), nickel (Ni), or combinations thereof.

In some embodiments, the metal-based salt additive is chosen from magnesium bis (trifluoromethanesulfonyl) imide, manganese bis (trifluoromethanesulfonyl) imide, or a combination thereof.

In some embodiments, the metal-based salt additive is present in an amount of from about 1.0 wt. % to about 3.0 wt. %, based on a total weight of the electrolyte composition.

In some embodiments, wherein the lithium-based salt is chosen from lithium hexafluorophosphate, lithium tetrafluoroborate, lithium bis (fluorosulfonyl) imide, lithium bis (trifluoromethanesulfonyl) imide, or combinations thereof and is present in the solvent blend at a concentration of from about 0.5 M to about 1.5 M.

In some embodiments, a ratio of cyclic carbonate to linear carbonate in the solvent blend is from about 1:9 to about 9:1. Fluoroethylene carbonate is present in the electrolyte composition in an amount of from about 1.5 wt. % to about 2.5 wt. %, based on a total weight of the electrolyte composition. Vinylene carbonate is present in the electrolyte composition in the amount of from about 0.5 wt. % to about 1.5 wt. %, based on the total weight of the electrolyte composition.

The above features and advantages and other features and advantages of the present disclosure are readily apparent from the following detailed description of the best modes for carrying out the disclosure when taken in connection with the accompanying drawings.

DETAILED DESCRIPTION

Figure 1:
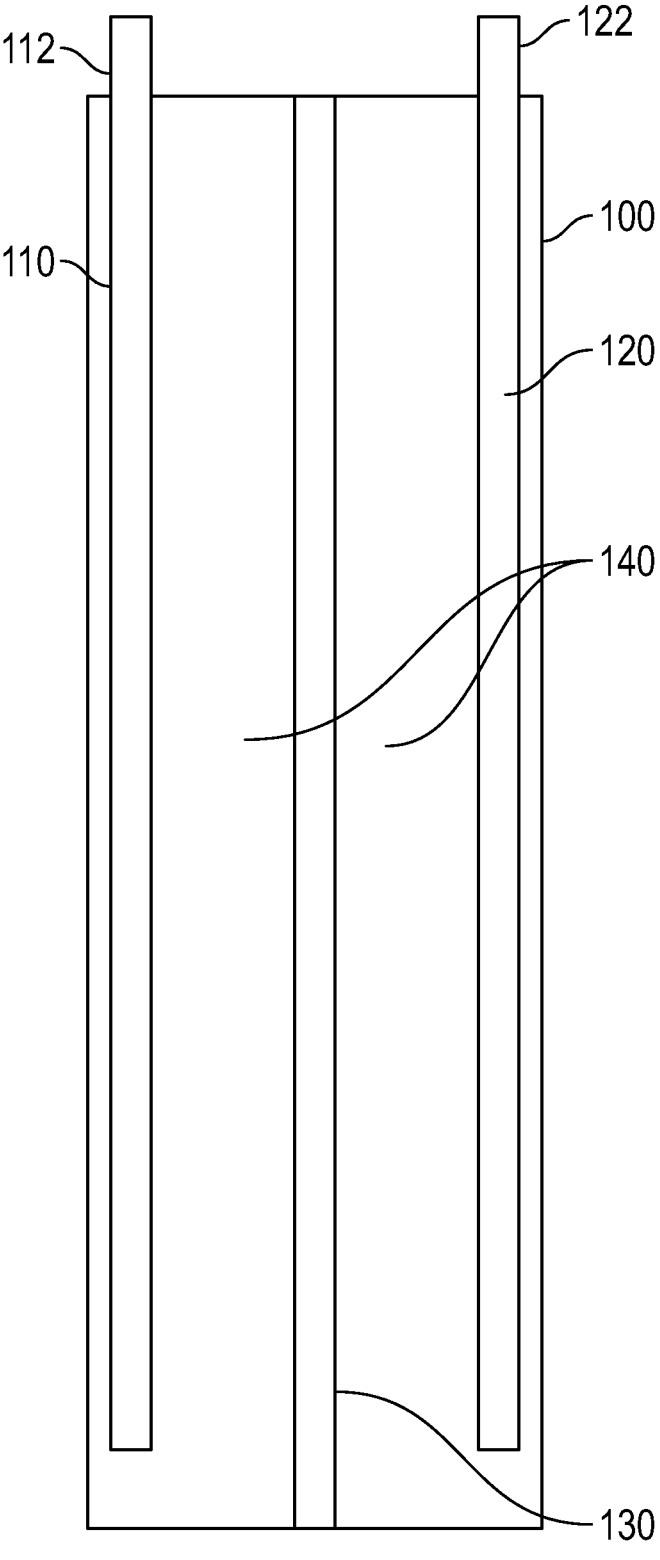
FIG. 1 schematically illustrates an exemplary battery cell including an anode, a cathode, a separator, and an electrolyte composition, in accordance with the present disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

High-capacity and high-power nickel-based cathode materials are useful for a lithium-ion energy storage system powering a battery electric vehicle. Such an energy storage system may be described as a high energy density battery. The battery cells may include a silicon-containing anode and a nickel-based cathode.

A capacity and cycling tolerance of the battery cells may vary according to operating conditions. Battery cell performance may vary according to cathode and anode material selection. An electrolyte composition disclosed herein provides excellent cycle life for the battery cells. In one embodiment, the electrolyte composition includes a solvent blend including cyclic carbonate and linear carbonate. The electrolyte composition may further include a lithium-based salt, fluoroethylene carbonate, and vinylene carbonate. In one or more embodiments of the disclosure, the electrolyte composition further includes a metal-based salt additive that includes counterions of a metal and trifluoromethanesulfonimide (TFSI). The metal may be magnesium (Mg), manganese (Mn), aluminum (Al), iron (Fe), or nickel (Ni). Non-limiting examples of the metal-based salt additive include magnesium bis (trifluoromethanesulfonyl) imide (MgTFSI) and/or manganese bis (trifluoromethanesulfonyl) imide (MnTFSI). In one or more embodiments of the disclosure, the metal-based salt additive is present in an amount of from about 1.0 wt. % to about 3.0 wt. %, based on a total weight of the electrolyte composition.

Testing has shown that addition of metal-based salt additive, e.g., MgTFSI, MnTFSI, or the like) in the described weight percentages improves solid electrolyte interface (SEI) formation on the anode and forms an excellent preservation layer upon both the cathode and the anode. An SEI may form upon a surface of an anode. An SEI results from a chemical reaction between the anode and a liquid or gel electrolyte interacting with the anode. The SEI forms as a film upon the anode and has been found to improve the cycle life for the battery cell.

Referring now to the drawings, wherein like reference numbers refer to like features throughout the several views, FIG. 1 schematically illustrates an exemplary battery cell 100, including an anode 110, a cathode 120, a separator 130, and an electrolyte composition 140. The battery cell 100 enables converting electrical energy into stored chemical energy in a charging cycle, and the battery cell 100 enable converting stored chemical energy into electrical energy in a discharging cycle. A negative current collector 112 is illustrated connected to the anode 110, and a positive current collector 122 is illustrated connected to the cathode 120. The separator 130 is operable to separate the anode 110 from the cathode 120 and to enable ion transfer through the separator 130. The electrolyte composition 140 is a liquid or gel that provides a lithium-ion conduction path between the anode 110 and the cathode 120.

The anode 110 may be constructed of silicon, a silicon alloy, or other silicon-containing material. The cathode 120 may be constructed of a nickel-based substance. In one embodiment, the cathode 120 is constructed of a nickel-rich substance, for example a nickel manganese cobalt (NMC) substance or a nickel cobalt manganese aluminum (NCMA) substance.

In one or more embodiments of the disclosure, the electrolyte composition 140 includes a solvent blend, a lithium-based salt, fluoroethylene carbonate (FEC), vinylene carbonate (VC), and a metal-based salt additive. The solvent blend includes cyclic carbonate, for example ethylene carbonate (EC), and linear carbonate, for example dimethyl carbonate (DMC). In an exemplary embodiment, a ratio of cyclic carbonate to linear carbonate, e.g., EC to DMC, in the solvent blend is from about 1:9 to about 9:1, such as from about 2:7 to about 4:7, for example about 3:7.

Non-limiting examples of the lithium-based salt include lithium hexafluorophosphate, lithium tetrafluoroborate, lithium bis (fluorosulfonyl) imide, and/or lithium bis (trifluoromethanesulfonyl) imide. In an embodiment, the lithium-based salt is present in the solvent blend at a concentration from about 0.5 molarity (M) to about 1.5 M, for example about 1 M.

In an embodiment of the disclosure, fluoroethylene carbonate and vinylene carbonate are added to the electrolyte composition 140. In an exemplary embodiment, fluoroethylene carbonate is present in the electrolyte composition 140 in an amount of from about 1.5 wt. % to about 2.5 wt. %, for example about 2.0 wt. %, based on a total weight of the electrolyte composition 140. In an exemplary embodiment, vinylene carbonate is present in the electrolyte composition 140 in an amount of from about 0.5 wt. % to about 1.5 wt. %, for example about 1.0 wt. %, based on a total weight of the electrolyte composition 140.

In one or more embodiments of the disclosure, the metal-based salt additive includes counterions of a metal and trifluoromethanesulfonimide (TFSI). The metal may be chosen from magnesium (Mg), manganese (Mn), aluminum (Al), iron (Fe), and/or nickel (Ni). In one embodiment, the metal-based salt additive includes or consists of magnesium bis (trifluoromethanesulfonyl) imide (MgTFSI). In another embodiment, the metal-based salt additive includes or consists of manganese bis (trifluoromethanesulfonyl) imide (MnTFSI). In an exemplary embodiment, the metal-based salt additive is present in an amount of from about 1.0 wt. % to about 3.0 wt. %, such as from about 1.5 wt. % to about 2.5 wt. %, for example about 2.0 wt. %, based on a total weight of the electrolyte composition 140.

Figure 2:
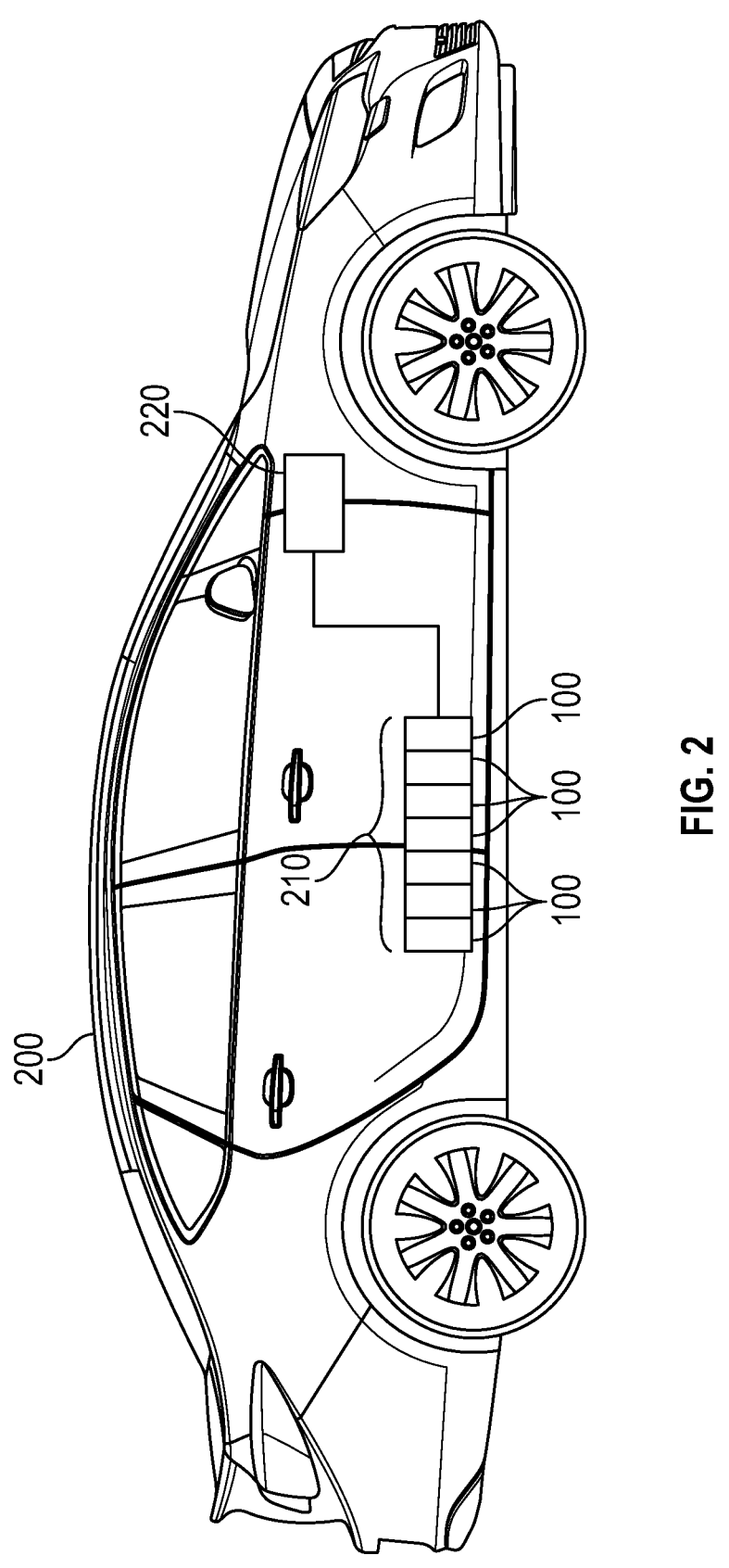
FIG. 2 schematically illustrates an exemplary device including a battery pack including a plurality of battery cells, in accordance with the present disclosure.

The battery cell 100 may be utilized in a wide range of applications and powertrains. FIG. 2 schematically illustrates an exemplary device 200, e.g., a battery electric vehicle (BEV), including a battery pack 210 that includes a plurality of battery cells 100. The plurality of battery cells 100 may be connected in various combinations, for example, with a portion being connected in parallel and a portion being connected in series, to achieve goals of supplying electrical energy at a desired voltage. The battery pack 210 is illustrated as electrically connected to a motor generator unit 220 useful to provide motive force to the vehicle 200. The motor generator unit 220 may include an output component, for example, an output shaft, which is provided mechanical energy useful to provide the motive force to the vehicle 200. A number of variations to vehicle 200 are envisioned, and the disclosure is not intended to be limited to the examples provided.

Figures 3, 4:
FIG. 3 is a graph illustrating exemplary test results comparing capacity retention of a battery cell versus a number of charge/discharge cycles through which the battery cell is operated, with a plurality of different electrolyte compositions including one electrolyte composition that includes magnesium bis (trifluoromethanesulfonyl) imide, in accordance with the present disclosure.
FIG. 4 is a graph illustrating exemplary test results comparing capacity retention of a battery cell versus a number of charge/discharge cycles through which the battery cell is operated, with a plurality of different electrolyte compositions including one electrolyte composition that includes manganese bis (trifluoromethanesulfonyl) imide, in accordance with the present disclosure.

FIG. 3 is a graph 300 illustrating exemplary test results of a relationship between capacity retention of a battery cell and a number of charge/discharge cycles through which the battery cell is operated. A vertical axis 304 is illustrated describing a capacity retention of the tested battery cell as a percentage of an original battery capacity. A horizontal axis 302 is illustrated describing the number of charge/discharge cycles. The battery cell includes an NCMA cathode (Ni-, Co-, Mn-, Al-containing cathode, e.g., Li $[Ni_{0.90}CO_{0.045}Mn_{0.045}Al_{0.01}]$ (2) and an anode formed of 5.5 wt. % $SiO_x$+graphite (Gr). Plot 310 illustrates the results of the battery cell with a baseline electrolyte composition of 1 M lithium hexafluorophosphate ($LiPF_6$) in a solvent blend of ethylene carbonate (EC) and dimethyl carbonate (DMC) at an EC:DMC ratio of 3:7. Plot 320 illustrates the results of the battery cell with the baseline electrolyte composition with fluoroethylene carbonate (FEC) added at 2 wt. % and vinylene carbonate (VC) added at 1 wt. %. Plot 330 illustrates the results of the battery cell with the electrolyte composition 140 of FIG. 1, which includes the baseline electrolyte composition, with 2 wt. % FEC, 1 wt. % VC, and MgTFSI added at 2 wt. %. One may see that MgTFSI significantly enhances the battery cell cycling performance (>5%), with the battery cells tested retaining excellent capacity over increasing numbers of charge/discharge cycles.

FIG. 4 is a graph 400 illustrating exemplary test results of a relationship between capacity retention of a battery cell and a number of charge/discharge cycles through which the battery cell is operated. A vertical axis 404 is illustrated describing a capacity retention of the tested battery cell as a percentage of an original battery capacity. A horizontal axis 402 is illustrated describing the number of charge/discharge cycles. The battery cell includes an NCMA cathode and an anode formed of 5.5 wt. % $SiO_x$+Gr. Plot 410 illustrates the results of the battery cell with a baseline electrolyte composition of 1 M $LiPF_6$ in a solvent blend of EC and DMC at an EC:DMC ratio of 3:7. Plot 420 illustrates the results of the battery cell with the baseline electrolyte composition with FEC added at 2 wt. % and VC added at 1 wt. %. Plot 430 illustrates the results of the battery cell with the electrolyte composition 140 of FIG. 1, which includes the baseline electrolyte composition, with 2 wt. % FEC, 1 wt. % VC, and MnTFSI added at 2 wt. %. One may see that MnTFSI significantly enhances the battery cell cycling performance (>5%), with the battery cells tested retaining excellent capacity over increasing numbers of charge/discharge cycles.

While the best modes for carrying out the disclosure have been described in detail, those familiar with the art to which this disclosure relates will recognize various alternative designs and embodiments for practicing the disclosure within the scope of the appended claims.

What is claimed is:

1. An electrolyte composition for batteries, the electrolyte composition comprising:
   a solvent blend comprising cyclic carbonate and linear carbonate;
   a lithium-based salt;
   fluoroethylene carbonate;
   vinylene carbonate; and
   a metal-based salt additive consisting of counterions of a metal and trifluoromethanesulfonimide, wherein the metal is iron (Fe);
   wherein the metal-based salt additive is present in an amount of from 1.0 wt. % to 3.0 wt. %, based on a total weight of the electrolyte composition.

2. The electrolyte composition of claim 1, wherein the lithium-based salt is present in the solvent blend at a concentration of from 0.5 molarity (M) to 1.5M.

3. The electrolyte composition of claim 1, wherein a ratio of cyclic carbonate to linear carbonate in the solvent blend is from 1:9 to 9:1.

4. The electrolyte composition of claim 1, wherein fluoroethylene carbonate is present in the electrolyte composition in an amount of from 1.5 wt. % to 2.5 wt. %, based on a total weight of the electrolyte composition.

5. The electrolyte composition of claim 1, wherein vinylene carbonate is present in the electrolyte composition in an amount of from 0.5 wt. % to 1.5 wt. %, based on a total weight of the electrolyte composition.

6. The electrolyte composition of claim 1, wherein the metal-based salt additive is present in the electrolyte composition in an amount of from 1.5 wt. % to 2.5 wt. %, based on a total weight of the electrolyte composition, wherein the lithium-based salt is chosen from lithium hexafluorophosphate, lithium tetrafluoroborate, lithium bis(fluorosulfonyl) imide, lithium bis(trifluoromethanesulfonyl) imide, or combinations thereof and is present in the solvent blend at a concentration of from 0.5M to 1.5M, wherein fluoroethylene carbonate is present in the electrolyte composition in the amount of from 1.5 wt. % to 2.5 wt. %, based on the total weight of the electrolyte composition, and wherein vinylene carbonate is present in the electrolyte composition in the amount of from 0.5 wt. % to 1.5 wt. %, based on the total weight of the electrolyte composition.

7. A battery comprising:
a silicon-containing anode;
a nickel-based cathode; and
an electrolyte composition disposed between the silicon-containing anode and the nickel-based cathode, the electrolyte composition comprising:
a solvent blend comprising cyclic carbonate and linear carbonate;
a lithium-based salt;
fluoroethylene carbonate;
vinylene carbonate; and
a metal-based salt additive consisting of counterions of a metal and trifluoromethanesulfonimide, wherein the metal is iron (Fe);
wherein the metal-based salt additive is present in an amount of from 1.0 wt. % to 3.0 wt. %, based on a total weight of the electrolyte composition.

8. The battery of claim 7, wherein a ratio of cyclic carbonate to linear carbonate in the solvent blend is from 1:9 to 9:1.

9. The battery of claim 7, wherein the lithium-based salt is chosen from lithium hexafluorophosphate, lithium tetrafluoroborate, lithium bis(fluorosulfonyl) imide, lithium bis(trifluoromethanesulfonyl) imide, or combinations thereof and is present in the solvent blend at a concentration of from 0.5M to 1.5M.

10. The battery of claim 7, wherein fluoroethylene carbonate is present in the electrolyte composition in an amount of from 1.5 wt. % to 2.5 wt. %, based on a total weight of the electrolyte composition, and wherein vinylene carbonate is present in the electrolyte composition in the amount of from 0.5 wt. % to 1.5 wt. %, based on the total weight of the electrolyte composition.

11. A device comprising:
an output component; and
a battery configured for providing electrical energy to the output component, the battery comprising:
a silicon-containing anode;
a nickel-based cathode; and
an electrolyte composition disposed between the silicon-containing anode and the nickel-based cathode, the electrolyte composition comprising:
a solvent blend comprising cyclic carbonate and linear carbonate;
a lithium-based salt;
fluoroethylene carbonate;
vinylene carbonate; and
a metal-based salt additive consisting of counterions of a metal and trifluoromethanesulfonimide, wherein the metal is iron (Fe);
wherein the metal-based salt additive is present in an amount of from 1.0 wt. % to 3.0 wt. %, based on a total weight of the electrolyte composition.

12. The device of claim 11, wherein the lithium-based salt is chosen from lithium hexafluorophosphate, lithium tetrafluoroborate, lithium bis(fluorosulfonyl) imide, lithium bis(trifluoromethanesulfonyl) imide, or combinations thereof and is present in the solvent blend at a concentration of from 0.5M to 1.5M.

13. The device of claim 11, wherein a ratio of cyclic carbonate to linear carbonate in the solvent blend is from 1:9 to 9:1, wherein fluoroethylene carbonate is present in the electrolyte composition in an amount of from 1.5 wt. % to 2.5 wt. %, based on a total weight of the electrolyte composition, and wherein vinylene carbonate is present in the electrolyte composition in the amount of from 0.5 wt. % to 1.5 wt. % to 1.5 wt. %, based on the total weight of the electrolyte composition.

* * * * *